US010082857B1

United States Patent
Czamara et al.

(10) Patent No.: US 10,082,857 B1
(45) Date of Patent: Sep. 25, 2018

(54) COOLING ELECTRICAL SYSTEMS BASED ON POWER MEASUREMENTS

(75) Inventors: Michael P. Czamara, Seattle, WA (US); John W. Eichelberg, Spokane, WA (US)

(73) Assignee: Amazon Technologies, Inc., Seattle, WA (US)

( * ) Notice: Subject to any disclaimer, the term of this patent is extended or adjusted under 35 U.S.C. 154(b) by 607 days.

(21) Appl. No.: 13/569,057

(22) Filed: Aug. 7, 2012

(51) Int. Cl.
| | |
|---|---|
| *G06F 1/32* | (2006.01) |
| *G06F 11/30* | (2006.01) |
| *G06F 9/50* | (2006.01) |
| *G06F 1/20* | (2006.01) |
| *H05K 7/20* | (2006.01) |
| *G06F 1/18* | (2006.01) |

(52) U.S. Cl.
CPC ............ *G06F 1/3203* (2013.01); *G06F 1/189* (2013.01); *G06F 1/206* (2013.01); *G06F 9/5094* (2013.01); *G06F 11/3006* (2013.01); *G06F 11/3062* (2013.01); *H05K 7/2079* (2013.01); *H05K 7/20745* (2013.01); *H05K 7/20836* (2013.01); *G06F 2217/80* (2013.01)

(58) Field of Classification Search
CPC .......... G06F 1/20; G06F 1/206; G06F 1/3203; G06F 9/5094; G06F 11/3006; G06F 11/3062; G06F 11/3096; G06F 17/5009; G06F 2217/80; H05K 7/20745; H05K 7/2079; H05K 7/20836
USPC ..................................................... 307/29, 18
See application file for complete search history.

(56) References Cited

U.S. PATENT DOCUMENTS

| | | |
|---|---|---|
| 3,481,485 A | 12/1969 | Hess |
| 3,807,572 A | 4/1974 | Luvara et al. |
| 3,834,423 A | 9/1974 | Elson |
| 3,915,477 A | 10/1975 | Timmons |
| 4,082,092 A | 4/1978 | Foster |
| 4,328,897 A | 5/1982 | Weiss |
| 4,448,111 A | 5/1984 | Doherty |
| 4,585,122 A | 4/1986 | Stegenga |

(Continued)

FOREIGN PATENT DOCUMENTS

| | | |
|---|---|---|
| EP | 0 546 211 | 6/1993 |
| EP | 0741269 | 11/1996 |

(Continued)

OTHER PUBLICATIONS

U.S. Appl. No. 12/751,212, filed Mar. 31, 2010, Michael P. Czamara.

(Continued)

*Primary Examiner* — Crystal J Barnes-Bullock
(74) *Attorney, Agent, or Firm* — Robert C. Kowert; Meyertons, Hood, Kivlin, Kowert & Goetzel, P.C.

(57) ABSTRACT

A system includes one or more electrical systems, an electrical power distribution system, one or more power sensors, an air handling system, and one or more controllers. The electrical power distribution system includes power distribution lines. The power distribution lines supply electrical power to the electrical systems. The power sensors are coupled to the power distribution lines. The power sensors sense characteristics of electrical power supplied to at least one of the electrical systems (for example, current draw). The one or more controllers control the air handling system based on characteristics measured by the power sensors.

30 Claims, 6 Drawing Sheets

(56) References Cited

U.S. PATENT DOCUMENTS

| | | |
|---|---|---|
| 4,864,469 A | 9/1989 | Boudon |
| 4,926,291 A | 5/1990 | Sarraf |
| 5,208,722 A | 5/1993 | Ryan et al. |
| 5,294,049 A | 3/1994 | Trunkle et al. |
| 5,412,534 A | 5/1995 | Cutts et al. |
| 5,473,507 A | 12/1995 | Schwegler et al. |
| 5,506,750 A | 4/1996 | Carteau et al. |
| 5,518,277 A | 5/1996 | Sanders |
| 5,621,890 A | 4/1997 | Notarianni et al. |
| 5,644,472 A | 7/1997 | Klein |
| 5,682,289 A | 10/1997 | Schwegler et al. |
| 5,751,549 A | 5/1998 | Eberhardt et al. |
| 5,772,500 A | 6/1998 | Harvey et al. |
| 5,796,580 A | 8/1998 | Komatsu et al. |
| 5,806,438 A | 9/1998 | Beaudet |
| 5,822,184 A | 10/1998 | Rabinovitz |
| 5,843,131 A | 12/1998 | McDonough |
| 5,871,396 A | 2/1999 | Shen |
| 6,031,717 A | 2/2000 | Baddour et al. |
| 6,039,190 A | 3/2000 | Clausen |
| 6,141,986 A | 11/2000 | Koplin |
| 6,166,917 A | 12/2000 | Anderson |
| 6,259,605 B1 | 7/2001 | Schmitt |
| 6,364,009 B1 | 4/2002 | MacManus et al. |
| 6,425,417 B1 | 7/2002 | Paschke |
| 6,456,498 B1 | 9/2002 | Larson et al. |
| 6,459,579 B1 | 10/2002 | Farmer et al. |
| 6,469,899 B2 | 10/2002 | Hastings et al. |
| 6,496,366 B1 | 12/2002 | Coglitore et al. |
| 6,499,609 B2 | 12/2002 | Patriche et al. |
| 6,525,936 B2 | 2/2003 | Beitelmal et al. |
| 6,563,704 B2 | 5/2003 | Grouell et al. |
| 6,590,768 B1 | 7/2003 | Wiley |
| 6,603,661 B2 | 8/2003 | Smith et al. |
| 6,621,693 B1 | 9/2003 | Potter et al. |
| 6,625,020 B1 | 9/2003 | Hanson et al. |
| 6,650,535 B1 | 11/2003 | Moss et al. |
| 6,725,132 B2 | 4/2004 | Frankel et al. |
| 6,754,082 B1 | 6/2004 | Ding et al. |
| 6,767,280 B1 | 7/2004 | Berger |
| 6,791,836 B2 | 9/2004 | Cipolla et al. |
| 6,795,314 B1 | 9/2004 | Arbogast et al. |
| 6,804,123 B1 | 10/2004 | Cheng |
| 6,819,567 B2 | 11/2004 | Baker et al. |
| 6,833,995 B1 | 12/2004 | Hsue et al. |
| 6,859,366 B2 | 2/2005 | Fink et al. |
| 6,960,130 B2 | 11/2005 | Gebke et al. |
| 7,003,966 B2 | 2/2006 | Sharma et al. |
| 7,010,392 B2 | 3/2006 | Bash et al. |
| 7,031,154 B2 | 4/2006 | Bash et al. |
| 7,035,111 B1 | 4/2006 | Lin et al. |
| 7,042,722 B2 | 5/2006 | Suzuki et al. |
| 7,068,505 B2 | 6/2006 | Kosugi |
| 7,112,131 B2 | 9/2006 | Rasmussen et al. |
| 7,197,433 B2 | 3/2007 | Patel et al. |
| 7,238,104 B1 | 7/2007 | Greenslade et al. |
| 7,257,956 B2 | 8/2007 | Shimada et al. |
| 7,272,001 B2 | 9/2007 | Cheng |
| 7,278,273 B1 | 10/2007 | Whitted et al. |
| 7,283,358 B2 | 10/2007 | Campbell et al. |
| 7,346,913 B2 | 3/2008 | Ishimine et al. |
| 7,361,081 B2 | 4/2008 | Beitelmal et al. |
| 7,379,299 B2 | 5/2008 | Walsh et al. |
| 7,403,385 B2 | 7/2008 | Boone et al. |
| 7,408,775 B2 | 8/2008 | Walz et al. |
| 7,434,413 B2 | 10/2008 | Wruck |
| 7,447,920 B2 * | 11/2008 | Sharma .................. G06F 9/505 |
| | | 713/300 |
| 7,486,505 B2 | 2/2009 | Fushimi et al. |
| 7,499,286 B2 | 3/2009 | Berke et al. |
| 7,500,911 B2 | 3/2009 | Johnson et al. |
| 7,542,288 B2 | 6/2009 | Lanus |
| 7,596,476 B2 * | 9/2009 | Rasmussen ............... G06F 1/20 |
| | | 361/695 |
| 7,620,613 B1 * | 11/2009 | Moore ............... H05K 7/20836 |
| | | 700/28 |
| 7,660,116 B2 | 2/2010 | Claassen et al. |
| 7,660,117 B2 | 2/2010 | Werner et al. |
| 7,701,710 B2 | 4/2010 | Tanaka et al. |
| 7,733,666 B2 | 6/2010 | Ichihara et al. |
| 7,746,634 B2 | 6/2010 | Hom et al. |
| 7,764,498 B2 | 7/2010 | Conn |
| 7,768,780 B2 | 8/2010 | Coglitore et al. |
| 7,768,787 B2 | 8/2010 | Vaughan et al. |
| 7,804,685 B2 | 9/2010 | Krietzman |
| 7,821,790 B2 | 10/2010 | Sharma et al. |
| 7,843,685 B2 | 11/2010 | Beauchamp et al. |
| 7,869,210 B2 | 1/2011 | Moss |
| 7,878,888 B2 | 2/2011 | Rasmussen et al. |
| 7,929,300 B1 | 4/2011 | Bisbikis et al. |
| 7,944,700 B2 | 5/2011 | Wang et al. |
| 7,990,700 B2 | 8/2011 | Guo |
| 8,087,979 B2 | 1/2012 | Rasmussen |
| 8,154,870 B1 | 4/2012 | Czamara et al. |
| 8,315,841 B2 * | 11/2012 | Rasmussen ............. G06F 1/206 |
| | | 361/695 |
| 8,407,004 B2 * | 3/2013 | Ware ........................ G01P 5/02 |
| | | 454/282 |
| 8,712,735 B2 * | 4/2014 | VanGilder .......... H05K 7/20836 |
| | | 703/1 |
| 8,949,091 B2 * | 2/2015 | Bhagwat ............ H05K 7/20836 |
| | | 703/5 |
| 9,116,897 B2 * | 8/2015 | Rowan ................ G06F 11/3006 |
| 9,223,905 B2 * | 12/2015 | Dalgas ................ G06F 17/5004 |
| 9,521,787 B2 * | 12/2016 | Chainer ............. H05K 7/20836 |
| 9,753,465 B1 * | 9/2017 | Ghose .................... G05D 23/19 |
| 2001/0029163 A1 | 10/2001 | Spinazzola et al. |
| 2002/0021557 A1 | 2/2002 | Ishimine et al. |
| 2002/0100736 A1 | 8/2002 | Lopez |
| 2002/0134531 A1 | 9/2002 | Yanagida |
| 2002/0181194 A1 | 12/2002 | Ho et al. |
| 2003/0125886 A1 * | 7/2003 | Spitaels .................... H02J 3/14 |
| | | 702/62 |
| 2003/0156385 A1 | 8/2003 | Askeland et al. |
| 2004/0020224 A1 | 2/2004 | Bash et al. |
| 2004/0027003 A1 * | 2/2004 | Yang .............................. 307/39 |
| 2004/0032722 A1 | 2/2004 | Wrycraft et al. |
| 2004/0165349 A1 | 8/2004 | Arbogast et al. |
| 2004/0218355 A1 | 11/2004 | Bash et al. |
| 2005/0040779 A1 | 2/2005 | Frankel et al. |
| 2005/0135069 A1 | 6/2005 | King et al. |
| 2005/0166860 A1 | 8/2005 | Austin et al. |
| 2005/0188689 A1 | 9/2005 | Juby et al. |
| 2005/0228618 A1 | 10/2005 | Patel et al. |
| 2005/0237716 A1 | 10/2005 | Chu et al. |
| 2005/0257232 A1 | 11/2005 | Hidaka |
| 2005/0265004 A1 | 12/2005 | Coglitore et al. |
| 2005/0281014 A1 | 12/2005 | Carullo et al. |
| 2006/0059937 A1 | 3/2006 | Perkins et al. |
| 2006/0061955 A1 | 3/2006 | Imblum |
| 2006/0250766 A1 | 11/2006 | Blaalid et al. |
| 2006/0274496 A1 | 12/2006 | Lee et al. |
| 2006/0290245 A1 | 12/2006 | Hidaka |
| 2007/0053169 A1 | 3/2007 | Carlson et al. |
| 2007/0058336 A1 | 3/2007 | Cheng |
| 2007/0074525 A1 | 4/2007 | Vinson et al. |
| 2007/0076369 A1 | 4/2007 | Chen et al. |
| 2007/0101746 A1 | 5/2007 | Scholm et al. |
| 2007/0159790 A1 | 7/2007 | Coglitore et al. |
| 2007/0213000 A1 | 9/2007 | Day |
| 2007/0217172 A1 | 9/2007 | Bisbikis et al. |
| 2007/0223200 A1 | 9/2007 | Fujiya et al. |
| 2007/0240433 A1 | 10/2007 | Manole |
| 2008/0013275 A1 | 1/2008 | Beckley et al. |
| 2008/0029250 A1 | 2/2008 | Carlson et al. |
| 2008/0037209 A1 | 2/2008 | Niazi et al. |
| 2008/0043427 A1 | 2/2008 | Lee et al. |
| 2008/0055846 A1 | 3/2008 | Clidaras et al. |
| 2008/0094797 A1 | 4/2008 | Coglitore et al. |
| 2008/0112127 A1 | 5/2008 | June et al. |
| 2008/0158813 A1 | 7/2008 | Yin |
| 2008/0186670 A1 * | 8/2008 | Lyon et al. ..................... 361/687 |
| 2008/0191590 A1 | 8/2008 | Lin et al. |

(56) References Cited

U.S. PATENT DOCUMENTS

| | | |
|---|---|---|
| 2008/0232064 A1 | 9/2008 | Sato et al. |
| 2008/0259566 A1 | 10/2008 | Fried |
| 2008/0285232 A1 | 11/2008 | Claassen et al. |
| 2008/0305733 A1 | 12/2008 | Noteboom et al. |
| 2009/0061755 A1 | 3/2009 | Calder et al. |
| 2009/0086441 A1 | 4/2009 | Randall et al. |
| 2009/0097200 A1 | 4/2009 | Sharma et al. |
| 2009/0109609 A1 | 4/2009 | Lai et al. |
| 2009/0122505 A1 | 5/2009 | Lu |
| 2009/0138313 A1* | 5/2009 | Morgan .................. G06Q 10/06 705/7.23 |
| 2009/0167228 A1* | 7/2009 | Chung et al. ................. 318/455 |
| 2009/0234512 A1* | 9/2009 | Ewing et al. ................. 700/295 |
| 2009/0237877 A1 | 9/2009 | Honda et al. |
| 2009/0257187 A1 | 10/2009 | Mills et al. |
| 2009/0260384 A1 | 10/2009 | Champion et al. |
| 2009/0296322 A1 | 12/2009 | Yang et al. |
| 2009/0307515 A1* | 12/2009 | Bandholz et al. ............. 713/340 |
| 2009/0321105 A1 | 12/2009 | Sawyer |
| 2010/0024445 A1 | 2/2010 | Cichanowicz |
| 2010/0091458 A1 | 4/2010 | Mosier et al. |
| 2010/0149754 A1 | 6/2010 | Chapel et al. |
| 2010/0271766 A1 | 10/2010 | Lin |
| 2011/0093128 A1* | 4/2011 | Wang et al. .................. 700/295 |
| 2011/0149508 A1 | 6/2011 | Malekmadani |
| 2011/0284422 A1 | 11/2011 | Yamada |
| 2011/0306287 A1* | 12/2011 | Takagi ................. F24F 11/0079 454/184 |
| 2011/0307102 A1* | 12/2011 | Czamara et al. ............. 700/277 |
| 2012/0074794 A1* | 3/2012 | Morales .................... G06F 1/26 307/147 |
| 2012/0092811 A1 | 4/2012 | Chapel et al. |
| 2012/0278503 A1* | 11/2012 | DeCusatis ............. G06F 9/5094 709/240 |
| 2014/0014292 A1 | 1/2014 | Rice et al. |

FOREIGN PATENT DOCUMENTS

| | | | |
|---|---|---|---|
| EP | 2053911 | 4/2009 | |
| EP | 2202751 | 6/2010 | |
| JP | 2010-86450 | 4/2010 | |
| WO | 9834450 | 8/1998 | |
| WO | 2008143503 | 11/2008 | |
| WO | WO-2012142262 A1 * | 10/2012 | ......... H05K 7/20818 |

OTHER PUBLICATIONS

U.S. Appl. No. 12/751,206, filed Mar. 31, 2010, Michael W. Schrempp.
U.S. Appl. No. 12/751,209, filed Mar. 31, 2010, Michael P. Czamara.
U.S. Appl. No. 12/163,146, filed Jun. 27, 2008, Osvaldo P. Morales.
U.S. Appl. No. 12/893,813, filed Sep. 29, 2010, Richard C. Towner.
U.S. Appl. No. 11/535,180, filed Sep. 26, 2006, Osvaldo P. Morales.
U.S. Appl. No. 12/886,437, filed Sep. 20, 2010, Peter G. Ross.
U.S. Appl. No. 12/886,472, filed Sep. 20, 2010, Peter G. Ross.
U.S. Appl. No. 12/886,469, filed Sep. 20, 2010, Peter G. Ross.
U.S. Appl. No. 11/956,849, filed Dec. 14, 2007, Osvaldo P. Morales.
U.S. Appl. No. 12/646,417, filed Dec. 23, 2009, Michael P. Czamara.
U.S. Appl. No. 12/341,137, filed Dec. 28, 2008, Jonathan David Hay.
U.S. Appl. No. 12/886,440, filed Sep. 20, 2010, Peter GRoss et al.
U.S. Appl. No. 13/103,860, filed May 9, 2011, Michael P. Czamara.
U.S. Appl. No. 13/781,271, filed Feb. 28, 2013, Charles Nakia Springs.

* cited by examiner

COOLING ELECTRICAL SYSTEMS BASED ON POWER MEASUREMENTS

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

Computer systems typically include a number of components that generate waste heat. Such components include printed circuit boards, mass storage devices, power supplies, and processors. For example, some computers with multiple processors may generate 250 watts of waste heat. Some known computer systems include a plurality of such larger, multiple-processor computers that are configured into rack-mounted components, and then are subsequently positioned within a racking system. Some known racking systems include 40 such rack-mounted components and such racking systems will therefore generate as much as 10 kilowatts of waste heat. Moreover, some known data centers include a plurality of such racking systems. Some known data centers include methods and apparatus that facilitate waste heat removal from a plurality of racking systems, typically by circulating air through one or more of the rack systems.

Many data center cooling systems include temperature sensors that provide information on current temperature conditions in the data center. If the temperature sensor indicates a rise in ambient temperature in room of the data center, for example, a control unit for the cooling system may react by increasing cooling to the room (for example, by turning up a fan, or increasing a flow of chilled water through the cooling system.)

In most data centers, an increase or decrease in server component operating temperatures is not immediately reflected in thermal sensors. It may take several minutes, for example, before an increase (or decrease) in the operating temperatures of CPUs in a rack-mounted server registers in an ambient temperature sensor mounted on the side of a rack for the server. As such, the response of the cooling system to changes thermal conditions may lag behind the actual cooling needs of the servers.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods for cooling electrical systems based on power measurements are disclosed. According to one embodiment, a data center includes computing devices, an electrical power distribution system, one or more power sensors, an air handling system, and a controller. The electrical power distribution system includes power distribution lines. The power distribution lines supply electrical power to the computing devices. The power sensors are coupled to the power distribution lines. The power sensors sense characteristics of electrical power supplied to at least one of the computing devices (for example, current draw). The controller is coupled to the power sensors. The controller controls air moving devices in the air handling system based on characteristics measured by the power sensors.

According to one embodiment, a system includes one or more electrical systems, an electrical power distribution system, one or more power sensors, an air handling system, and one or more controllers. The electrical power distribution system includes power distribution lines. The power distribution lines supply electrical power to the electrical systems. The power sensors are coupled to the power distribution lines. The power sensors sense characteristics of electrical power supplied to at least one of the electrical systems (for example, current draw). The one or more controllers control the air handling system based on characteristics measured by the power sensors.

According to one embodiment, a method of controlling an environment for electrical systems includes sensing characteristics of electrical power being supplied to one or more electrical systems, and controlling air used to remove heat from at least one of the electrical systems based on the sensed characteristics of the electrical power.

According to one embodiment, a control unit includes a processor and a memory coupled to the processor. The memory stores program instructions executable by the processor to implement: receiving information from one or more power sensors; and controlling or more air handling systems based at least in part on one or more characteristics measured by at least one of the power sensors.

According to one embodiment, a method of controlling an environment for computing devices includes receiving information about an activity level for operating one or more computing devices (for example, network traffic to and from the computing devices), and controlling air used to remove heat from at least one of the computing devices based on the activity level information for operating the computing devices.

As used herein, "air handling system" means a system that provides air to one or more systems or components. An air handling system may be, for example, a fan system or an air conditioning unit.

As used herein, a "cable" includes any cable, conduit, or line that carries one or more conductors and that is flexible over at least a portion of its length. A cable may include a connector portion, such as a plug, at one or more of its ends.

As used herein, "computing" includes any operations that can be performed by a computer, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, a programmable hardware element such as a field programmable gate array, or other programmable circuit, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "computer room" means a room of a building in which computer systems, such as rack-mounted servers, are operated.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, one component in a power distribution system is "downstream" from another component in the power distribution system if the one component receives power from the other component or is at a lower level in the power distribution system than the other component. For example, a floor PDU may be downstream from a UPS, or a power supply unit in a server may be downstream from a rack PDU.

As used herein, a "module" is a component or a combination of components physically coupled to one another. A module may include functional elements and systems, such as computer systems, circuit boards, racks, blowers, ducts, and power distribution units, as well as structural elements, such a base, frame, housing, or container.

As used herein, "power distribution unit" means any device, module, component, or combination thereof, that can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, isolation.

As used herein, "power panel" means any panel, device, module, component, or combination thereof, that can be used to transfer or distribute electrical power from one or more input conductors to one or more output conductors. In certain embodiments, a remote power panel includes main lug only panel conductors. A remote power panel may be housed in an enclosure, such as a cabinet.

As used herein, "primary power" means any power that can be supplied to an electrical load, for example, during normal operating conditions.

As used herein, a "rack" means a rack, container, frame, or other element or combination of elements that can contain or physically support one or more computing devices.

As used herein, a "rack computing system" means a computing system that includes one or more computing devices mounted in a rack.

As used herein, "rack power distribution unit" refers to a power distribution unit that can be used to distribute electrical power to various components in a rack. A rack power distribution may include various components and elements, including wiring, bus bars, connectors, and circuit breakers.

As used herein, "reserve power" means power that can be supplied to an electrical load upon the failure of, or as a substitute for, primary power to the load.

As used herein, "source power" includes power from any source, including but not limited to power received from a utility feed. In certain embodiments, "source power" may be received from the output of a transformer.

As used herein, a "switching device" means any device, element, or combination thereof, that can be operated to open or close an electrical switch.

In some embodiments, a system controls an air handling system based on power characteristics measured by power sensors for electrical systems being cooled. Measurements may include, in one embodiment, current draw for some or all of the servers in a room of a data center. The power sensors may be coupled to an electrical power distribution system that supplies electrical power to the computing devices. The power sensors may be current transformers. In some embodiments, the system operates a variable frequency drive to control the speed of one or more fans in an air handling system based on power measurements.

Figure 1:
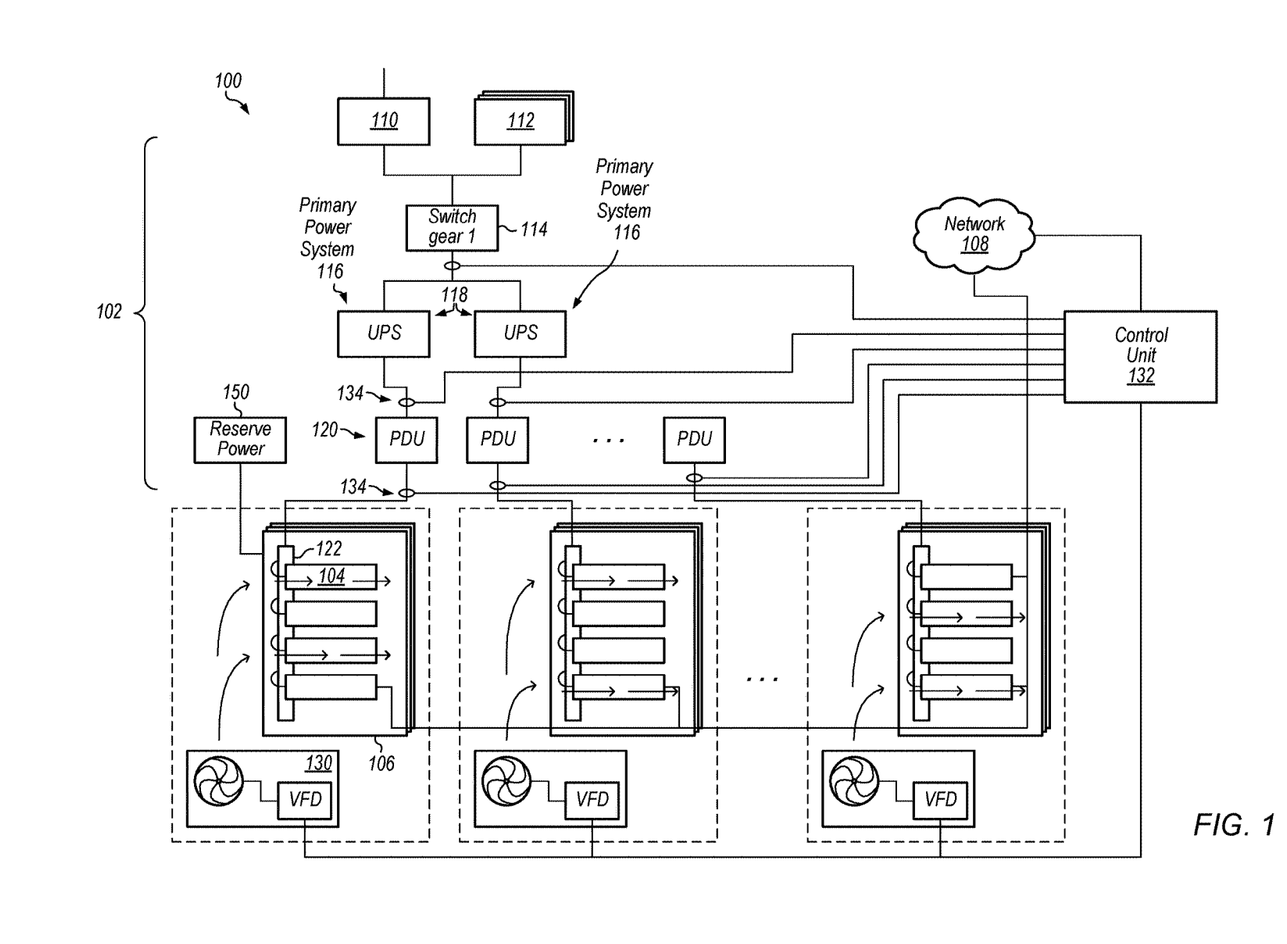
FIG. 1 is a block diagram illustrating one embodiment of a system including a controller that receives input from electrical power sensors at multiple locations in an electrical power distribution system.

FIG. 1 is a block diagram illustrating one embodiment of a system including a controller that receives input from electrical power sensors at multiple locations in an electrical power distribution system. System 100 includes power distribution system 102 and electrical systems 104. In one embodiment, system 100 is a data center. Electrical systems 104 may include, for example, computing devices, rack-mounted servers, network control devices, power supply units, air moving devices, and mass storage devices. Electrical systems 104 may be supported in racks 106. Electrical systems 104 may perform various functions in a data center, such as data storage or network services. In one embodiment, electrical systems 104 are servers in a server room of a data center. Electrical systems 104 may be connected to one another and to external systems by way of network 108, for example, by way of Ethernet or other network connections.

Each of electrical systems 104 may include a power supply unit. The power supply unit may supply power to various electrical components, such as integrated circuits, central processing units, solid state memory, and hard disk drives in electrical systems 104.

Power distribution system 102 includes transformer 110, generators 112, switchgear apparatus 114, and primary power systems 116. Each of primary power systems 116 includes one of UPSs 118 and one or more power panels 120.

Electrical systems 104 in racks 106 may each receive power from one of primary power systems 116. In one embodiment, each of primary power systems 116 corresponds to, and provides power to, the servers in one room in a data center. In one embodiment, each of primary power systems 116 corresponds to, and provides power to, one rack system in a data center. In FIG. 1, for the sake of clarity, electrical systems 104 are shown coupled to only one of power panels 120. Electrical systems may, however, be coupled to any or all of power panels 120 in a data center.

Power panels 120 may distribute power from UPSs to electrical systems 104 in racks 106. Power panels 120 may include circuit protection devices, such as circuit breakers. In certain embodiments, power panels 120 are floor power distribution units. In some embodiments, some or all of power panels 120 include a transformer that transforms the voltage from switchgear apparatus 114.

Each of racks 106 may include one or more rack power distribution units 122. The rack power distribution units 122 may distribute power to power supply units in computer systems 104. In one embodiment, each rack power distribution unit 122 distributes electrical power to half of the electrical systems (for example, servers) in a rack.

System 100 includes air handling systems 130, control unit 132, and power sensors 134. Each of air handling systems includes air moving device 136 and variable frequency drive 138. Variable frequency drives 138 may be operated to control air moving devices 136. Each of air handling systems 130 may be operated to remove heat from one or more electrical systems 104.

In the embodiment shown in FIG. 1, each of air handling systems 130 may be operated to remove air from electrical systems 104 in one of zones 140. Each of zones 140 may be, for example, a computer room, a row of racks within a room, or a computing pod.

Power sensors 134 may sense one or more characteristics of power in one or more lines that transmit power. Power sensors 134 may sense, for example, a current draw by one or more loads, such as current draw by electrical systems 104 operating in system 100. In one embodiment, power sensors 134 are current transformers. Types of power sensors that may be used in system 100 include voltage sensors, voltage transformers, electronic meters and electro-mechanical meters. Examples of power characteristics and conditions that may be sensed by a power sensor include power loss, power anomaly, phase, power redundancy, current levels, voltage levels, and usage levels.

Controller 132 is coupled to air handling systems 130 and power sensors 134. Controller 132 may control operations in air handling systems 130 based on information (for example, signals) from power sensors 134. Controller 132 may operate variable frequency drives 138 to increase or decrease air flow through racks 106.

In some embodiments, controller 132 uses information from power sensors 134 to anticipate changes in cooling requirements for electrical systems 104. For example, if power sensors 134 indicate an increase in current draw by electrical systems 104, controller 132 may project that heat rejected into air moving through the associated racks 106 will increase. Based on the projected increase in heat rejection by electrical systems 104, controller 132 may be operated to increase air flow in the associated racks 106. If power sensors 134 indicate a decrease in current draw by electrical systems 104, controller 132 may project that heat rejected into air moving through the associated racks 106 will decrease. Based on the projected decrease in heat rejection by electrical systems 104, controller 132 may be operated to reduce air flow in the associated racks 106.

In some embodiments, controller 132 is the sole controller for air handling systems 130. In other embodiments, one or more of air handling systems 130 have additional controllers. For example, each of air handing systems 130 may have its own dedicated air handling unit control system. Controller 132 may exchange signals with such air handling unit control systems.

In some embodiments, electrical systems, or sets of electrical systems, are assigned one or more identifiers. In some embodiments, power components in a power distribution system, such as power panels, are assigned one or more identifiers. Each identifier may serve as an address for the electrical system, rack system, power component, or a constituent element thereof. The address may be used to map loads (such as server racks) and power components in a system. An identifier may have any suitable format. In some embodiments, a separate identifier may be assigned for the component itself and for additional elements, inputs, or outputs within the component. For example, a separate identifier may be established for each power output receptacle of a power panel.

Transformer 110 is coupled to a utility feed. The utility feed may be a medium voltage feed. In certain embodiments, the utility feed is at a voltage of about 13.5 kilovolts or 12.8 kilovolts at a frequency of about 60 Hz. Generators 112 may provide power to primary power systems 116 in the event of a failure of utility power to transformer 110. In one embodiment, one of generators 112 provides back-up power for each of primary power systems 116.

UPS 118 may provide uninterrupted power to racks 106 in the event of a power failure upstream from UPS 118. In certain embodiments, a UPS receives three-phase power from a transformer. The UPS may supply three-phase power to a floor power distribution unit.

PDU power may be any suitable voltage. In one embodiment, electrical power is about 208 V. In one embodiment, electrical power is about 230 V. In some embodiments, different electrical systems 104 may operate on different phases of a primary power system. Each of the legs may correspond to one phase of the input power. In one embodiment, each leg operates at a voltage between about 220 volts to about 260 volts.

In operation of system 100, receptacles in rack PDU 122 may be used to supply power to electrical systems in rack 106, such as servers. Electrical systems 104 may be coupled to rack power distribution unit 122 by way of cables.

Each of the legs in rack PDU 122 may include a breaker. In one embodiment, each breaker is a 30A/32A single pole MCB. Breakers may be located such that they can be accessed when server racks are in-line (e.g., at the top of rack power distribution unit 126). In one embodiment, power is provided to a rack PDU by way of an 8 AWG/6 mm$^2$ 5 core cable and a 30A NEMA/32A IEC309 3Ph+N+E Plug.

Reserve power system 150 may provide reserve power for any or all of the electrical systems 104 supplied by primary power systems 116. In some embodiments, reserve power system 150 is powered up at all times during operation of system 100. Reserve power system 150 may be passive until a failure of one or more components of the primary power system for one or more of electrical systems 104, at which time reserve power system 150 may become active.

Controller 132 may be coupled to other system by way of network 108. Other systems may include, for example, remote systems, a building management system, or both. Controller 132 may control air handling operations internally (for example, independent of instructions from other systems), based on instructions or data received from remote systems or a building management system, or any combination thereof.

In certain embodiments, controller 132 may control air handling operations based on information about activity levels in electrical systems. Activity levels that can be used for controlling system 132 include, in various embodiments, processor activity or network traffic. Information about activity levels may be provided to controller 132 over network 108. In certain embodiments, activity level information may be used in combination with information about electrical power (for example, from power sensors 134).

For illustrative purposes, one switchgear apparatus 114, two UPSs 118, and three power panels 120 are shown in FIG. 1. The number of power distribution units, UPSs, switchgear apparatus may, however, vary from embodiment to embodiment (and, within a given embodiment, from system to system). For example, each of UPSs 118 may supply power to any suitable number of power panels 120. As another example, each of switchgear apparatus 114 may supply power to any suitable number of UPSs 118.

In some embodiments, a map is generated for electrical systems (for example, servers) that perform operations in a facility, power components in a power distribution system, or both. The map may be based on signals sent from various components in a data center. For example, in the embodiment shown in FIG. 1, a map can be established that includes sets of electrical systems 104 in racks 106 (for example, servers in one half of a particular rack), rack PDUs 122, power panels 120, and UPSs 118.

In some embodiments, computing assets are mapped to one or more power distribution system components and/or branches. Mapping may be based on IDs assigned to one or more assets, or sets of assets, of a system. In one embodiment, sets of computing devices operating in racks are mapped to circuit breakers that provide overcurrent protection for that set of computing devices. For example, Servers ID0001 through 0010 in Rack 0006 in Data Center 4 may be mapped to Circuit Breaker A021 in Power Panel PP062 in Data Center 4; Servers ID0011 through 0020 in Rack 0007 of Data Center 4 may be mapped to Circuit Breaker A022 in Power Panel PP062 in Data Center 4; etc. Load shedding may be implemented and monitored based on the mapping.

In some embodiments, baseline data for mapping of components one or more a computing facilities are stored in a database. At a later time, the map may be updated based on a new set of messages from components in the computing facilities. Comparisons between the baseline data and current data may be used to assess conditions or components.

In some embodiments, electrical power draw is assessed in one or more locations in a power distribution system. Power consumption may be monitored at any location in a power distribution system, including power supply units, rack PDUs, or UPSs. In certain embodiments, a system may perform corrective actions, such as switching to reserve power or shutting down an electrical system, based on power consumption information for one or more power components in a power distribution system.

Electrical systems 104 may be of various types. Examples include hospital equipment, utility systems, security systems, military systems, telecommunications systems, or electronic commerce systems. In certain embodiments, power measurements are used to control cooling of a critical system, such as a life support system. In some embodiments, the systems are computing devices (for example, servers) in a data center. In various alternative embodiments, electrical systems are not mounted in racks. For example, electrical systems may be office computing systems.

Figure 2:
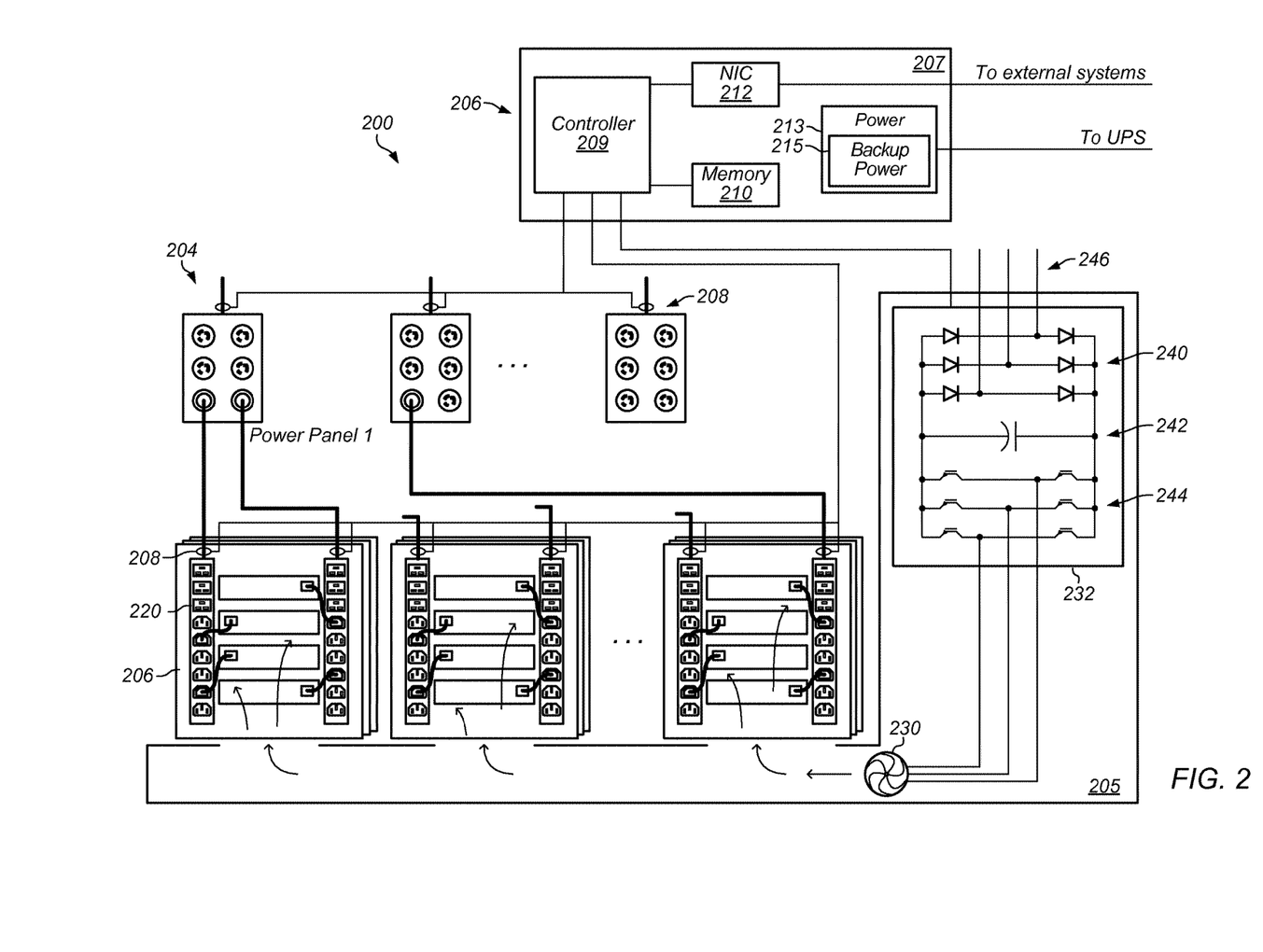
FIG. 2 illustrates one embodiment of a system that includes an air handing control unit and power sensors at multiple levels in an electrical power distribution system.

In some embodiments, air handling control system includes a control unit that is coupled to power sensors on electrical power distribution system for multiple rack computing systems within a data center. FIG. 2 illustrates one embodiment of a system that includes an air handing control unit and power sensors at multiple levels in an electrical power distribution system. System 200 includes control system 202, power panels 204, and air handling system 205. Power panels 204 may distribute power from an electrical power system to computing devices in rack computing systems 206. The electrical power distribution system may be similar to power distribution system 102 described above relative to FIG. 1.

Control system 202 includes control unit 207 and power sensors 208. Control unit 207 includes controller 209, memory 210, and network interface card 212. Controller 209 includes a microprocessor that implements program instructions for controlling air handling operations. Controller 209 may exchange information with external systems by way of network interface card 212. Controller 209 may store and access information on memory 210 for use in controlling air handling operations in rack computing systems 206.

In some embodiments, components of control unit 207 are contained in an enclosure. The enclosure may be mounted inside a rack, on a rack, or at another location. In some embodiments, an air handling control unit is rack-mountable. An air handling control unit may be any shape and size. In certain embodiments, an air handling control unit has a "zero U" form factor that allows installation in a rack such that the system does not consume any of the slots in a rack.

In some embodiments, an air handling control system includes data storage elements. For example, control unit 209 may include data storage elements for storing addresses corresponding to various sets of computing devices for a rack or half-rack. In some embodiments, an address may be stored in association with a physical location within a data center (for example, Row 6, Rack 4, left-side rack PDU.)

Network interface card 212 may exchange data and signals between control unit 207 and external systems by way of a network connection. In some embodiments, a load shedding device receives control instructions from an external system. In one embodiment, network interface card 212 is an Ethernet card. In another embodiment, network interface card 212 provides for a fiber optic transmission of data. In some embodiments, each of output is assigned an address, which is stored in memory 210.

Power module 213 may supply power to controller 209, memory 210, and NIC 212. Power module 213 includes backup power device 215. Power module 213 may receive power from the primary power system (for example, from power lines coming into one of power panels 204). Backup power device 215 may serve as backup power for control unit 202. Backup power device 215 may be any device that can at least temporarily supply power to control unit 209 in the event of a power loss from external sources (for example, if the primary power to which power module 213 is connected to has failed). Backup power device 215 may be, for example, a battery or a backup power capacitor. Power module may also be connected to an external reserve power source, such as a UPS.

Power sensors 208 may be similar to those described above relative to FIG. 1. In one embodiment, power sensors 208 are current transformers. Power sensors 208 may be provided at multiple locations in the power distribution system, multiple levels within the power distribution chain, and in multiple branches or power components at any given level in the power distribution chain. For example, in the embodiments shown in FIG. 2, power sensors are provided for input power to each of power panels 204 and each of rack power distribution units 220.

Air handling system 205 includes air moving device 230 and variable frequency drive 232. Control unit 207 may be operated to control air handling system 205. Air may be controlled based on information from power sensors 208.

Variable frequency drive 232 includes input converter 240, filter 242, and output inverter 244. Variable frequency drive 232 may receive three-phase input power 246. Variable frequency drive 232 may be operated to control air moving device 230 to regulate the flow rate of air in electrical systems 104.

Variable frequency drive 232 is coupled in electronic data communication with air handling control unit 202. VFD 232 may be coupled to a prime mover of air moving device 230. Moreover, VFD 232 may receive control signals from control unit 207 and subsequently modulate a rotational velocity of blades of air moving device 230 such that air flow through rack computing systems 206 is also modulated. The control signals from control unit 207 may be based on power measurements received from power sensors 208. In an alternative embodiment, dampers may also be modulated via control unit 207 to modulate air flow through selected ones of rack computing systems 206 based on input power measurements received from power sensors 208.

In some embodiments, an air handling system is controlled using weather data. Weather data may include, for example, conditions acquired at a weather station located at a data center. Conditions that may be taken into account may include temperature, humidity, and barometric pressure. In certain embodiments, weather data is combined with power measurements to control an air handling system. For example, if the weather forecast is for hot and humid conditions and power measurements indicate that heat rejection from rack computing systems in a data center will be relatively, air flow in the rack computing systems may be increased.

In certain embodiments, power measurement data is combined with information about air conditions taken from environmental sensors inside a data center. Characteristics of air in a data center that may be taken into account include ambient room temperature, pressure, humidity, internal server temperatures, and component temperatures. In some instances, measurements taken of air may be used to validate operation of an air handling system using electrical power measurements.

In some embodiments, an air handling control system reports to external systems status or other information relating to the air handling control system, electrical loads, and power distribution systems supplying power to electrical loads. Control unit 202 may report, for example, whether power is being fed to power panels, current draw through each of which power panels are receiving a feed, what phase combination is being fed, how long the feed has been on. An air handling control system may also report conditions of the operating environment for the electrical systems. For example, an air handling control system may report temperature, humidity, and pressure.

In some embodiments, messages are sent from a back-up feed device using Simple Network Management Protocol (SNMP) data (for example, an SNMP trap). Any network protocol, however, may be used in various embodiments to send data from, or receive data into, a load shedding device.

In some embodiments, an air handling control system may control an alarm on the air handling system or at the location of the rack PDUs. An alarm may be, for example, an audible alarm (such as a buzzer or siren) or a visual alarm (flashing light).

In some embodiments, a control system is coupled to air handling systems in two or more different facilities. For example, a control system may control air handling systems at multiple data centers in multiple locations. The control system may control heat removal for particular sets of computing devices at each data center, for example, on a rack-by-rack basis or half rack-by-half rack basis. In some embodiments, the control system assesses conditions, characteristics, or status of power to computing devices in each of multiple facilities. The system may determine which air handling systems to adjust, and in which facilities, based on the assessment.

Figure 3:
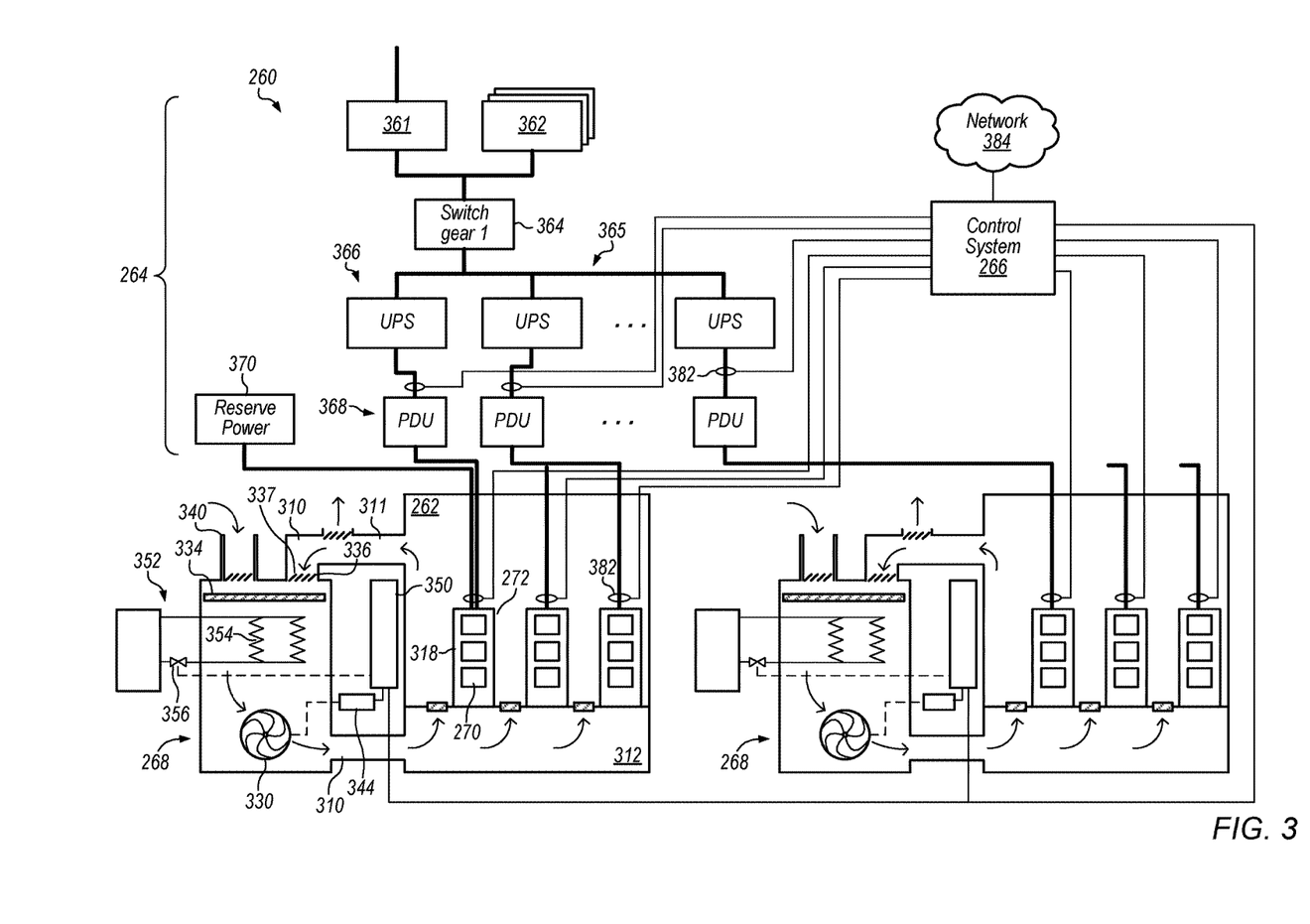
FIG. 3 illustrates one embodiment of an air handing control system for controlling computer room air conditioning (CRAC) units based on power measurements in an electrical power distribution system.

In some embodiments, an air handling control system controls mechanical cooling in a data center based on power measurements. FIG. 3 illustrates one embodiment of an air handing control system for controlling computer room air conditioning (CRAC) units based on power measurements in an electrical power distribution system. System 260 includes computer rooms 262, electrical power distribution system 264, and control system 266. Each of computer rooms 264 includes CRAC unit 268. CRAC units 268 may be operated to remove heat from electrical systems 270 operating in racks 272.

CRAC unit 268 may be coupled to data center room 262 by supply duct 310 and return duct 311. Cooling air may flow from air handling sub-system 314 through supply duct 310 into plenum 312. From plenum 312, cooling air may pass through into data center room 262. Cooling air may pass over racks 318. After the air is heated by racks 318, the air may pass through return duct 310. Air may be recirculated through one or more air handling sub-systems or discharged from the system through exhaust vent 320.

CRAC unit 268 includes fan 330, humidifier 332, filter 334, return air vent 336, return air dampers, outside air vent 340, and outside air dampers. Fan 350 is coupled to VFD 344. VFD 344 is coupled to control unit 350. Return air vent 338 may receive air returning from data center room through return duct 310. Outside air vent 340 may receive outside air.

CRAC unit 268 includes chilled water subsystems 352. Chilled water subsystems 352 may be coupled in heat transfer communication with air handling sub-systems 3. Chilled water sub-system 352 includes coils 354 and valve 356. Valve 356 is coupled to control unit 350. Valve 356 may be opened and closed by signals from control unit 350. The position of valve 356 may be used to regulate the use of chilled water to cool air in air handling sub-system 313. In one embodiment, a common chilled water subsystem 352 provides chilled water to two more of air handling sub-systems 504. In certain embodiments, each air handling sub-system 313 is cooled by a dedicated chilled water subsystem 352.

In some embodiments, chilled water subsystems 352 may be coupled to a chilled water heat removal system. Examples of chilled water heat removal systems include a service water subsystem, air-conditions refrigerant sub-system, or a cooling tower sub-system.

Control unit 350 may be programmed to control devices in handling sub-systems 313 and/or chilled water sub-systems 352. Control unit 350 may be coupled to fan 330, humidifier 332, return air dampers, outside air dampers, and exhaust dampers. Control unit 350 may be in data communication with temperature sensors and pressure sensors. Devices in air handling sub-systems 313 and chilled water sub-systems 352 may be controlled automatically, manually, or a combination thereof.

Electrical power system 360 includes transformer 361, generators 362, switchgear apparatus 364, and primary power systems 365. Each of primary power systems 365 includes UPS 366 and one or more floor power distribution units ("PDUs") 138.

Electrical systems in rack computing systems 318 may each receive power from one or more of primary power systems 365. In one embodiment, each of primary power systems 365 corresponds to, and provides power to, the servers in one room in a data center. In one embodiment, each of primary power systems 365 corresponds to, and provides power to, one rack system in a data center.

In some embodiments, one or more of floor power distribution units 368 includes a transformer that transforms the voltage from switchgear apparatus 364.

Transformer 361 is coupled to a utility feed. The utility feed may be a medium voltage feed. In certain embodiments, the utility feed is at a voltage of about 13.5 kilovolts or 12.8 kilovolts at a frequency of about 60 Hz. Generators 362 may provide power to primary power systems 365 in the event of a failure of utility power to transformer 361. In one embodiment, one of generators 362 provides back-up power for each of primary power systems 365.

UPS 366 may provide uninterrupted power to racks 270 in the event of a power failure upstream from UPS 366. In certain embodiments, a UPS receives three-phase power from a transformer. The UPS may supply three-phase power to a floor power distribution unit.

Electrical power system 264 includes a reserve power system 370. Reserve power system 370 may provide reserve power for any or all of the electrical systems supplied by one or more primary power systems. In some embodiments, a reserve power system is powered up at all times during operation of a data center. The reserve power system may be passive until a failure of one or more components of the primary power system for one or more of the electrical systems in the system, at which time the reserve power system may become active.

Control system 266 is coupled to CRAC units 268 and power sensors 382. Control system 266 may control operations in CRAC units 268 based on information (for example, signals) from power sensors 382. Control system 266 may operate variable frequency drives 344 via controller 350 to increase or decrease air flow through racks 318.

Control system 266 may be coupled to other system by way of network 384. Other systems may include, for example, remote systems, a building management system, or both. Control system 266 may control air handling operations internally (for example, independent of instructions from other systems), based on instructions or data received from remote systems or a building management system, or any combination thereof.

In one embodiment, CRAC units 268 include a VFD coupled to a prime mover of a pump. The VFD may be coupled in electronic data communication with control system 266 (for example, via controller 350). The VFD may receive control signals from control system 266 and subsequently modulate a rotational velocity of the pump such that chilled water flow through sub-system 352 is modulated. The control signals may be based on information from power sensors 380. In certain embodiments, control system 266 is also coupled in electronic data communication with valve 356. Valve 356 may receive control signals from controller 350 to modulate a position of valve 356 between fully open and fully closed positions wherein chilled water flow is modulated. Alternatively, only one of a pump or valve 356 may be modulated.

In one embodiment, VFDs use pulse width modulation (PWM) methods to modulate the rotational velocity of the associated prime movers. Alternatively, any method of modulation of fans or pumps that facilitates operation of system 260 as described herein is used. Furthermore, control system 266, controller 350, or both, may be provided with an algorithm to receive power measurement signals and modulate VFDs, valves, or both.

In some embodiments, control system 266 uses information from power sensors 382 to anticipate changes in cooling requirements for electrical systems 270. For example, if power sensors 382 indicate an increase in current draw by electrical systems 270, control system 266 may project that heat rejected into air moving through the associated racks 106 will increase. Based on the projected increase in heat rejection by electrical systems 270, control system 266 may be operated to increase air flow in the associated racks 318 (for example, by increasing a chilled air flow rate, increasing fan speed, or both). If power sensors 382 indicate a decrease in current draw by electrical systems 270, control system 266 may project that heat rejected into air moving through the associated racks 318 will decrease. Based on the projected decrease in heat rejection by electrical systems 270, control system 266 may be operated to reduce air flow in the associated racks 318 (for example, by reducing a chilled air flow rate, reducing fan speed, or both).

In certain embodiments, a control system is used to control dampers based on power measurements. For example, control system 260 may control dampers 337 to change the amount of air recirculated to computer room 262 based on measurements from power sensors 382.

In certain embodiments, a control system is used to control dampers based on power measurements. For example, control system 260 may switch from a mechanical cooling mode to a free cooling mode, or vice versa, based on information from power sensors 382.

Figure 4:
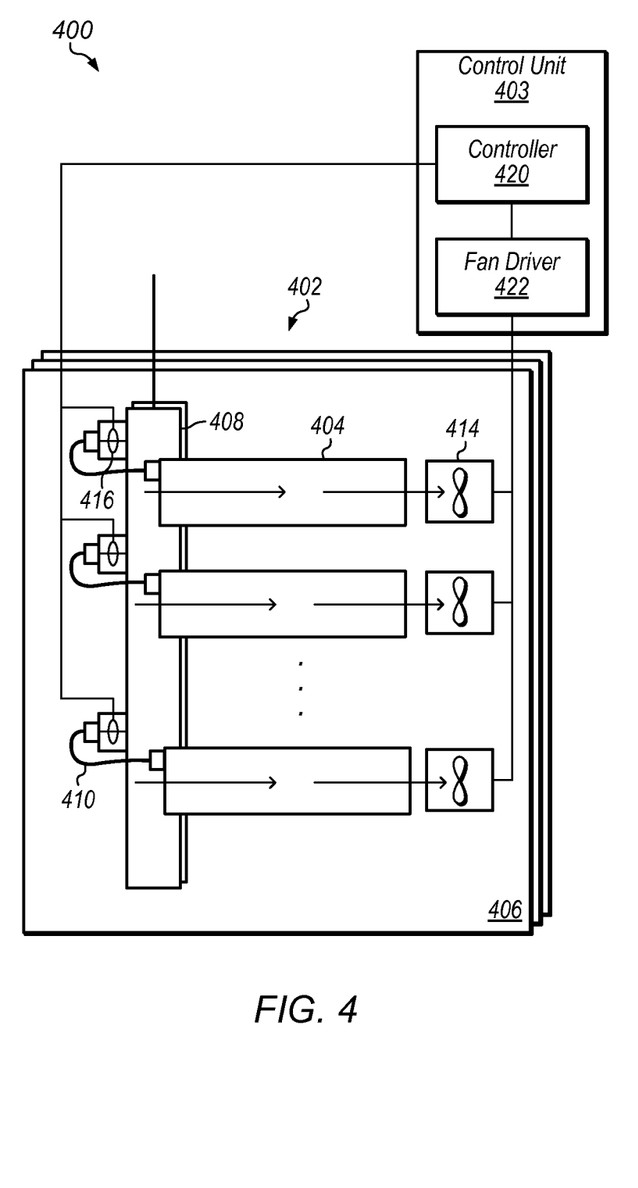
FIG. 4 illustrates one embodiment of a system that can control air flow in computing devices based on characteristics of power supplied to the computing devices.

In some embodiments, a system controls cooling at a computing device-level based on power measurements. FIG. 4 illustrates one embodiment of a system that can control air flow in computing devices based on power drawn by the computing devices. System 400 includes rack computing systems 402 and control unit 403. Rack computing systems 402 include computing devices 404 in racks 406. Computing devices 404 receive power from rack PDUs 408 by way of power cables 410. Power sensors 416 are provided at each power output receptacle that is used to supply power to one of computing devices 404. In one embodiment, each power sensor includes a current transformer. Fans 414 are provided for each of computing devices 404.

Control unit 403 includes controller 420 and fan driver 422. Controller 420 may receive signals from each of power sensors 416. The signals may be used to determine power characteristics for computing devices 404, such as current draw. Based on the determined power characteristics, controller 420 may control fan drivers 422 to control air flow in each of computing devices 404. In some embodiments, air flow is controlled independently for each computing device. For example, air flow for a computing device may be based on current draw from the computing device. For example, if the power sensor 414 on the uppermost of computing devices 404 indicates an increase in current draw, controller 420 may increase the speed of fan 414 for the uppermost computing device, while leaving the fan speed for the other fans 414 unchanged.

Figure 5:
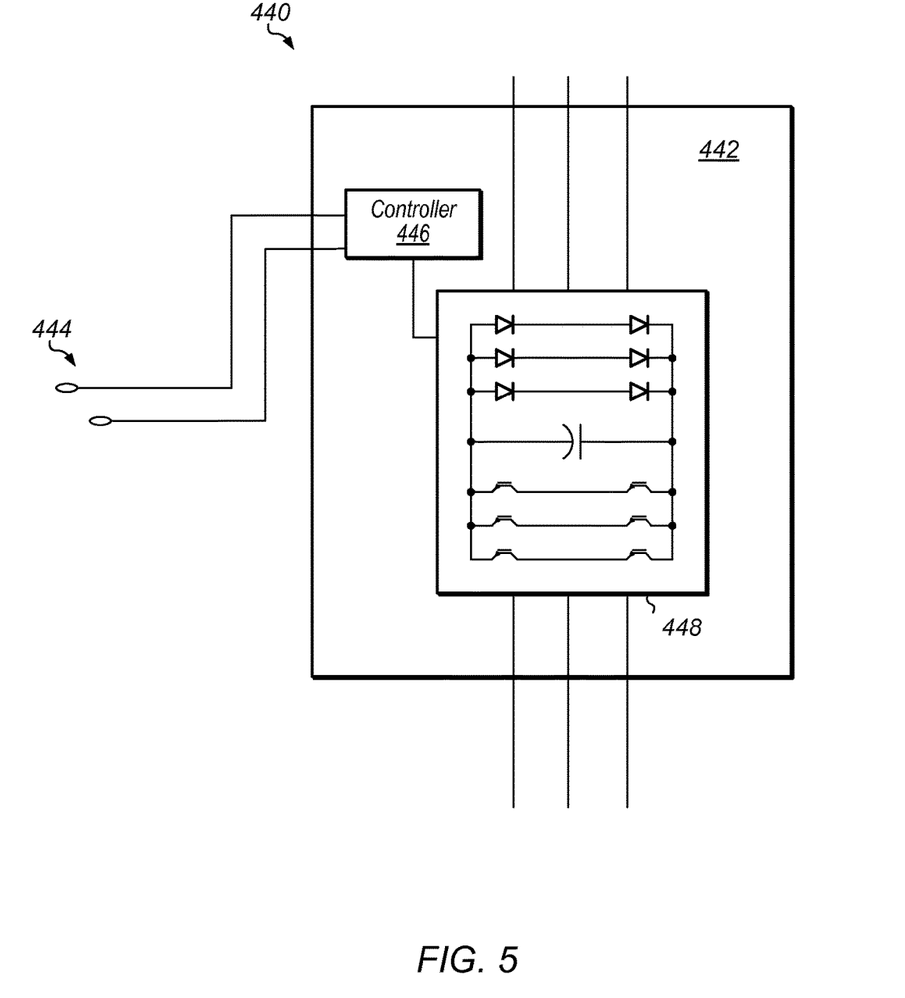
FIG. 5 illustrates one embodiment of an air handling unit control system.

FIG. 5 illustrates one embodiment of an air handling unit control system. Air handling system 440 includes air handling control unit 442 and power sensors 444. Air handling control unit 442 includes controller 446 and variable frequency drive 448. Controller 446 and variable frequency drive may be provided in a common enclosure. Controller 446 may control air moving devices coupled to variable frequency drive 448 based on signals from power sensors 444. In some embodiments, controller 446 may control other aspects of an air handling system, such as chilled water flow rate, mode of operation, or dampers.

Figure 6:
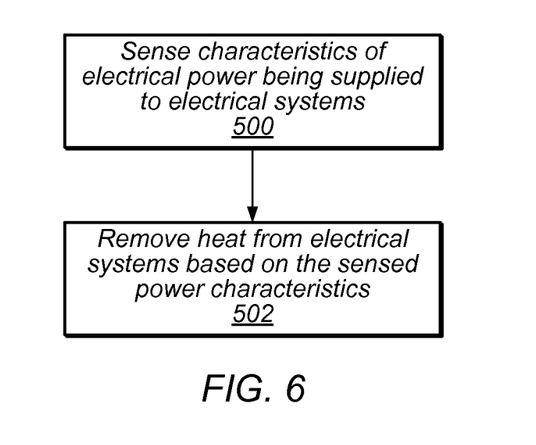
FIG. 6 illustrates one embodiment of controlling an environment for electrical systems based on power measurements.

In some embodiments, controlling an environment for electrical systems includes sensing characteristics of power being supplied to the electrical systems (for example, current draw), and controlling air used to remove heat from the electrical systems based on the sensed characteristics of the power. FIG. 6 illustrates one embodiment of controlling an environment for electrical systems based on power measurements. At 500, characteristics of electrical power being supplied to one or more electrical systems are sensed. The electrical systems may be, for example, computing devices operating in a data center. The characteristics may be, for example, current draw from some or all of the electrical systems.

At 502, air used to remove heat from at least one of the electrical systems is controlled based on sensed characteristics of the electrical power. In some embodiments, a change in cooling load is anticipated based on sensed characteristics. For example, a system may increase or decrease cooling based on current draw. Based on sensed power characteristics, airflow to the electrical systems may be increased or decreased.

In certain embodiments, power loads, power distribution components, or both, in a system may be mapped. Cooling of the system based at least in part on the mapping. A map may indicate, for example, areas of a data center that may require a greater flow of air to maintain temperatures within an acceptable range.

Figure 7:
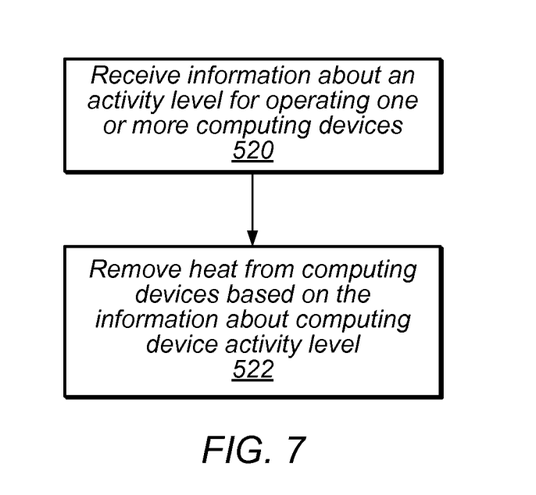
FIG. 7 illustrates controlling an environment for computing devices based on level of activity of the computing devices.

In some embodiments, controlling an environment for electrical systems includes receiving information about the activity level of computing devices and controlling an air handling system based on the sensed characteristics of the power. FIG. 7 illustrates controlling an environment for computing devices based on activity level of the computing devices. At 520, information is received about an activity level for operating one or more computing devices. Examples of system activity level that may be used include processor activity, network traffic, or a combination thereof. In certain embodiments, activity level information may be combined with power measurements.

At 522, air used to remove heat from computing devices based on the information received about the activity level for the computing devices. In some embodiments, activity level is used to predict an increase in thermal loads in a set of computing devices. For example, if the level of network traffic in data center is high, a system may anticipate that cooling needs will increase. Based on the projected increase, air flow may be increased to the computing devices in the data center.

In some embodiments, some loads in a system are given a different priority level than other loads in the system. For example, certain rack computing systems, power panels, power distribution units, or computing devices may be assigned a higher priority level than others in a data center. The system may respond differently to higher priority loads than to relatively lower priority loads. For example, a system may maintain temperatures in a Priority 1 rack at lower temperatures than a Priority 2 rack. The priority levels for each load (for example, each rack computing system) may be stored in memory and accessible by a controller.

In some embodiments, the system uses a power sensor data from one or more high priority loads to control cooling in a data center. A system may, for example, information from a power sensor in a Priority 1 rack to control an air handling system. In certain embodiments, information from power sensors in a high priority rack takes precedence over information from a power sensor associated with rack computing systems having a lower priority. Thus, for example, the power sensor information in one or more Priority 1 rack computing systems may control air handing in that Priority 1 racks, as well as rack computing systems having a lower level of priority.

In some embodiments, a priority is established based on information about usage, or anticipated usage, of a particular load, such as a particular set of racks. For example, if Rack Computing Systems 3-6 provide services for Customer A, and Customer A has provided advance notice that it will be operating at a high level of computing activity in a certain period of time, Rack Computing Systems 3-6 may be set at a high priority level for that period of time. The system may control cooling based on the assigned priority level.

In some embodiments, air handling control based on power measurements is carried out by implementing one or more rules. Rules may be applied by a controller as described above. Rules may be applied, for example, to automatically determine which circuits which air handling system conditions should be changed, in what order, and on what time schedule. Air handling system control based on power measurements may in certain embodiments include one or more optimization calculations. Optimization may include, for example, maintaining temperatures within a predetermined range using power measurements.

In some embodiments, switching devices are operated to shed loads on the electrical power systems from electrical systems in one or more rack systems. Shedding of loads may be based on information from power sensors, such as a power sensors 134 described above relative to FIG. 1. In one embodiment, the switching devices are shunt trip relays that trip circuit breakers in the power supply line to a set of computing devices in one of the racks. In some embodiments, loads are shed on a load circuit-by-load circuit basis. For example, loads may be shed from computing devices operating in a particular rack, or computing devices in a particular half of a rack (for example, top half and bottom half).

In certain embodiments, control of air handling systems based on power measurements may be used in combination with load shedding to control operating conditions for electrical systems. For example, if current draw data from power sensors predict that temperatures will exceed a maximum allowable level, the system may respond by shedding some rack computing systems and increasing air flow to rack computing systems that remain in operation.

In some embodiments, loads from selected rack systems are shed to maintain an aggregate load on the electrical system within acceptable limits. For example, in a data center in which computing devices are operating in 100 racks in the data center, loads from computing devices in 3 of the rack systems in the data center.

In some embodiments, loads are shed in a portion of a facility based on aggregate conditions, characteristics, or status of operations for at another portion of the facility. For example, if loads on a power distribution system spike because increased activity in Rack Computing Systems A, B, C in a data center, the system may shed loads from computing devices in Rack Computing System D.

In certain embodiments, an air handling control unit is provided with a reserve power system. A main power system may provide power the air handling control unit under normal conditions. The reserve power system may provide power in the event of a failure of the main power system. In one embodiment, reserve power to an air handling control unit is implemented by way of an automatic transfer switch. The automatic transfer switch may switch to reserve power in the event of a power loss to the main power system supplying power to the air handling control unit.

Although in many of the embodiments described herein, electrical power shedding is described for rack computing systems in a data center, air handling control based on power measurements may, in various embodiments, be performed for other types of electrical systems. For example, electrical power shedding may be performed for electrical systems at a power plant, manufacturing plant, medical care facility, or office building.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data center, comprising:
a plurality of computing devices;
an electrical power distribution system comprising:
power distribution lines;
a power panel; and
two or more rack power distribution units (PDUs) downstream of the power panel,
wherein the electrical power distribution system is configured to supply electrical power to a set of computing devices of the plurality of computing devices via the power panel and at least one of the two or more rack PDUs and supply electrical power to another set of computing devices of the plurality of computing devices via the power panel and at least one other rack PDU of the two or more rack PDUs;
one or more power sensors coupled to at least one of the power distribution lines upstream of the power panel, wherein the one or more power sensors are configured to sense one or more characteristics of electrical power supplied to two or more sets of computing devices of the plurality of computing devices; and
one or more power sensors coupled to at least one of the power distribution lines downstream of the power panel and upstream of at least one of the rack PDUs, wherein the one or more power sensors are configured to sense one or more characteristics of electrical power supplied to one of the sets of the computing devices of the plurality of computing devices;
an air handling system comprising one or more air moving devices; and
a controller coupled to at least two of the power sensors, wherein the controller is configured to:
anticipate one or more changes in cooling requirements in one or more of the plurality of computing devices before one or more corresponding temperature changes in the one or more computing devices is registered on a temperature sensor monitoring the one or more computing devices, wherein the controller is configured to anticipate the one or more changes in cooling requirements based on the one or more characteristics of electrical power supplied to the plurality of computing devices sensed by the one or more power sensors upstream of the power panel and the one or more characteristics of electrical power supplied to the one of the sets of computing devices of the plurality of computing devices sensed by the one or more power sensors downstream of the power panel; and
control at least one of the one or more air moving devices based at least in part on at least one of the anticipated one or more changes in the cooling requirements.

2. The data center of claim 1, wherein at least one of the sensed characteristics of the electrical power is a current draw by the plurality of computing devices.

3. The data center of claim 1, wherein the controller is configured to increase cooling in response to an increase in power consumption by the plurality of computing devices.

4. The data center of claim 1, wherein the at least one power sensor comprises a current transformer configured to measure current in at least one of the power distribution lines.

5. The data center of claim 1, wherein the controller is configured to control a speed of at least one of the air moving devices.

6. A system, comprising:
a plurality of electrical systems;
an electrical power distribution system comprising:
power distribution lines;
a power panel; and
two or more power distribution units (PDUs) downstream of the power panel, wherein the electrical power distribution system is configured to supply electrical power to a set of electrical systems of the plurality of electrical systems via the power panel and at least one of the two or more PDUs and supply electrical power to another set of electrical systems of the plurality of electrical systems via the power panel and at least one other PDU of the two or more PDUs;

one or more power sensors coupled to at least one of the power distribution lines upstream of the power panel, wherein the one or more power sensors are configured to sense one or more characteristics of electrical power supplied to two or more sets of electrical systems of the plurality of electrical systems s;

one or more power sensors coupled to at least one of the power distribution lines downstream of the power panel and upstream of at least one of the PDUs, wherein the one or more power sensors are configured to sense one or more characteristics of electrical power supplied to one of the sets of electrical systems of the plurality of electrical systems;

an air handling system; and one or more controllers coupled to at least two of the power sensors, wherein at least one of the one or more controllers is configured to:

anticipate one or more changes in cooling requirements in one or more of the plurality of electrical systems before one or more corresponding temperature changes in the one or more electrical systems is registered on a temperature sensor monitoring the one or more electrical systems, wherein the controller is configured to anticipate the one or more changes in cooling requirements based on the one or more characteristics of electrical power supplied to the two or more sets of electrical systems sensed by the one or more power sensors upstream of the power panel and the one or more characteristics of electrical power supplied to the one set of the sets of electrical systems sensed by the one or more power sensors downstream of the power panel; and control the air handling system based at least in part on at least one of the anticipated one or more changes in the cooling requirements.

7. The system of claim 6, wherein at least one of the characteristics of the electrical power is a current draw by one or more of the plurality of electrical systems.

8. The system of claim 6, wherein the at least one controller is configured to increase cooling in response to an increase in power consumption by the plurality of electrical systems.

9. The system of claim 6, wherein the at least one power sensor comprises a current transformer configured to sense current on at least one of the power distribution lines.

10. The system of claim 6, wherein the at least one controller is configured to control a variable frequency drive for at least one air moving device.

11. The system of claim 6, wherein the electrical power distribution system further comprises a switchgear upstream of the power panel, wherein at least one of the power sensors is at a location in the electrical power distribution system proximate to the switchgear.

12. The system of claim 6, wherein the one or more air moving devices comprise two or more air moving devices, wherein the one or more controllers are configured to control at least two of the air moving devices independently from one another based at least in part on power characteristics sensed by at least two of the power sensors.

13. The system of claim 6, wherein the at least one controller is configured to control a mode of operation of the air handling system based at least in part at least in part on at least one of the one or more characteristics sensed by the at least one power sensor.

14. The system of claim 6, wherein the at least one controller is configured to control a mechanical cooling unit based at least in part at least in part on at least one of the one or more characteristics sensed by the at least one power sensor.

15. The system of claim 6, wherein the at least one controller is configured to apply one or more rules to control the air handling system based at least in part at least in part on at least one of the one or more characteristics measured by the at least one power sensor.

16. The system of claim 6, wherein the at least one controller is configured to switch off power to at least a portion of the electrical systems based at least in part on at least one of the one or more characteristics sensed by the at least one power sensor.

17. The system of claim 6, wherein the at least one controller is configured to control operation of at least one of the air handling system based at least in part on weather data.

18. The system of claim 6, wherein the at least one controller is configured to control operation of the air handling system based at least in part on a level of computing activity in at least one of the one or more electrical systems.

19. The system of claim 6, wherein the at least one controller is configured to prioritize one or more sets of the electrical systems over at least a portion of the other electrical systems.

20. A method of controlling an environment for electrical systems, comprising:

sensing characteristics of electrical power being supplied to a set of electrical systems and another set of electrical systems upstream of a power panel that distributes electrical power to the set of electrical systems via a power distribution unit (PDU) and to the other set of electrical systems via another PDU;

sensing characteristics of electrical power being supplied to the set of electrical systems downstream of the power panel and upstream of the PDU that distributes electrical power to the set of electrical systems;

anticipating one or more changes in cooling requirements in the set of electrical systems before one or more corresponding temperature changes in the set of electrical systems is registered on a temperature sensor monitoring the set of electrical systems, wherein the one or more changes in cooling requirements are anticipated based on the one or more sensed characteristics of electrical power being supplied to the set of electrical systems and the other set of electrical systems upstream of the power panel and the one or more sensed characteristics of electrical power being supplied to the set of electrical systems downstream of the power panel and upstream of the PDU; and controlling, based at least in part on the anticipated one or more changes in cooling requirements, air used to remove heat from at least one of the electrical systems of the set of electrical systems.

21. The method of claim 20, wherein sensing characteristics of electrical power being supplied to the set of electrical systems comprises sensing current draw for the set of electrical systems, and wherein the air is controlled based at least in part on the current draw.

22. The method of claim 20, wherein controlling the air used to remove heat from the at least one electrical system comprises increasing cooling based on an increase in power consumption in the data center.

23. The method of claim 20, wherein controlling the air used to remove heat from the at least one electrical system comprises increasing or decreasing airflow.

24. The method of claim 20, further comprising mapping at least a portion of the power distribution system supplying electrical power to the set of electrical systems, wherein the air is controlled based at least in part on the mapping.

25. The method of claim 20, further comprising:
assigning one or more sets of the electrical systems a higher priority than at least a part of the other electrical systems,
wherein air used to remove heat from at least one of the one or more electrical systems is controlled based at least in part on sensed characteristics associated with the systems assigned the higher priority.

26. A control unit, comprising:
a computing device configured to:
receive information about two or more sets of electrical systems from one or more power sensors located in a power distribution system upstream of a power panel that distributes electrical power to two or more power distribution units (PDU) configured to distribute electrical power to respective ones of the two or more sets of electrical systems;
receive information about one of the two or more sets of electrical systems from one or more power sensors located in the power distribution system downstream of the power panel and upstream of one of the two or more PDUs;
anticipate one or more changes in cooling requirements in one or more of the sets of electrical systems before one or more corresponding temperature changes in the one or more sets of electrical systems is registered on a temperature sensor monitoring the one or more sets of electrical systems, wherein the computing device is configured to anticipate the one or more changes in cooling requirements based on the information about the two or more sets of electrical systems from the one or more power sensors upstream of the power panel and based on information about one of the sets of electrical systems from the one or more power sensors downstream of the power panel and upstream of one of the two or more PDUs; and
control one or more air handling systems based at least in part on the one or more anticipated changes in cooling requirements in the one or more electrical systems.

27. The control unit of claim 26, wherein at least one of the power sensors upstream of the power panel is at a location in the power distribution system proximate to a switchgear.

28. The control unit of claim 26, wherein the control unit is configured to receive a signal from one or more current transformers.

29. The control unit of claim 26, wherein the control unit is configured to control two or more air moving devices in at least one of the one or more air handling systems.

30. The control unit of claim 26, wherein the control unit is configured to control a variable frequency drive for at least one air moving device of the one or more air handling systems.

* * * * *